(12) United States Patent
Carlson et al.

(10) Patent No.: US 10,708,322 B1
(45) Date of Patent: Jul. 7, 2020

(54) MULTI-CHANNEL CONFERENCE BRIDGING

(71) Applicant: West Corporation, Omaha, NE (US)

(72) Inventors: Robert F. Carlson, Omaha, NE (US); David T. Zorko, Omaha, NE (US)

(73) Assignee: West Corporation, Omaha, NE (US)

( * ) Notice: Subject to any disclaimer, the term of this patent is extended or adjusted under 35 U.S.C. 154(b) by 81 days.

(21) Appl. No.: 15/785,632

(22) Filed: Oct. 17, 2017

(51) Int. Cl.
| | | |
|---|---|---|
| G06F 15/16 | (2006.01) | |
| H04L 29/06 | (2006.01) | |
| H04L 12/58 | (2006.01) | |
| H04L 12/18 | (2006.01) | |
| H04W 4/14 | (2009.01) | |
| H04L 29/08 | (2006.01) | |

(52) U.S. Cl.
CPC ........ *H04L 65/403* (2013.01); *H04L 12/1822* (2013.01); *H04L 51/36* (2013.01); *H04L 51/38* (2013.01); *H04L 67/306* (2013.01); *H04W 4/14* (2013.01)

(58) Field of Classification Search
None
See application file for complete search history.

(56) References Cited

U.S. PATENT DOCUMENTS

| | | | | |
|---|---|---|---|---|
| 2006/0067250 A1* | 3/2006 | Boyer | ................ | H04L 12/1818 370/260 |
| 2006/0115801 A1* | 6/2006 | Ganley | .................... | G09B 7/02 434/219 |
| 2008/0104169 A1* | 5/2008 | Combel | .................. | H04L 51/04 709/204 |
| 2009/0112997 A1* | 4/2009 | Parker, II | ................ | H04L 67/24 709/206 |
| 2014/0106721 A1* | 4/2014 | Calman | .................... | H04M 3/56 455/416 |
| 2016/0044070 A1* | 2/2016 | Panicker | ................ | H04L 65/403 709/204 |

* cited by examiner

Primary Examiner — Mohamed Ibrahim (57) ABSTRACT

Processing customer communications may include receiving a communication from a customer device via a messaging application. One example method of operation may include receiving a conference initiation notification from one of a plurality of conference participant devices at a conference server, identifying a plurality of different communication mediums corresponding to the plurality of conference participant devices, selecting an initial communication medium to establish a conference with the plurality of conference participant devices, and transmitting a conference contact message to the plurality of conference participant devices to initiate a conference.

20 Claims, 12 Drawing Sheets

MULTI-CHANNEL CONFERENCE BRIDGING

TECHNICAL FIELD OF THE APPLICATION

This application relates to a conference call bridging function and more specifically to utilizing multiple different channels when establishing a conference bridge.

BACKGROUND OF THE APPLICATION

Conventionally, when a conference call is scheduled, a scheduled conference date may be set, and other information may be recorded in the form of an electronic calendar or other application used to manage the conference call. There are many channels that connect groups together, especially since smartphones entered the marketplace. Some options include messenger applications, phone, video, SMS, etc., however, sometimes after any of those example connections is initiated it may become necessary to switch channels. For example, what may begin as a communication session in a messenger application may require switching to a voice conference to share more in-depth information.

SUMMARY OF THE APPLICATION

Example embodiments of the present application provide at least a method that includes at least one of receiving a conference initiation notification from one of a plurality of conference participant devices at a conference server, identifying a plurality of different communication mediums corresponding to the plurality of conference participant devices, selecting an initial communication medium to establish a conference with the plurality of conference participant devices, and transmitting a conference contact message to the plurality of conference participant devices to initiate a conference.

Another example embodiment may provide an apparatus that includes a receiver configured to receive a conference initiation notification from one of a plurality of conference participant devices at a conference server, and a processor configured to identify a plurality of different communication mediums corresponding to the plurality of conference participant devices, select an initial communication medium to establish a conference with the plurality of conference participant devices, and a transmitter configured to transmit a conference contact message to the plurality of conference participant devices to initiate a conference.

Still another example embodiment may include a non-transitory computer readable storage medium configured to store instructions that when executed causes a processor to perform receiving a conference initiation notification from one of a plurality of conference participant devices at a conference server, identifying a plurality of different communication mediums corresponding to the plurality of conference participant devices, selecting an initial communication medium to establish a conference with the plurality of conference participant devices, and transmitting a conference contact message to the plurality of conference participant devices to initiate a conference.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, a user device, such as a smartphone, cellular phone, tablet device, laptop or other computing device with a memory and processor, may communicate with a conference call setup and bridging application. The communications performed to setup the conference call, attend the conference call, etc., may be performed through a combination of mediums, such as phone calls, text messages including but not limited to short message service (SMS) messaging, and e-mail. Also, other communication mediums may be used to communicate with the user device and the conference call management server 'conference server' and/or conference call bridge server 'bridge server'. In one example the interaction between a user device and the servers may begin with an inbound voice call/SMS message in this example. It could also be initiated by an outbound call or SMS message. The application may prompt the caller to select a conference, respond to a pending invitation or initiate a new conference procedure. The user information can be collected and stored in a data repository managed by the servers.

Figure 1:
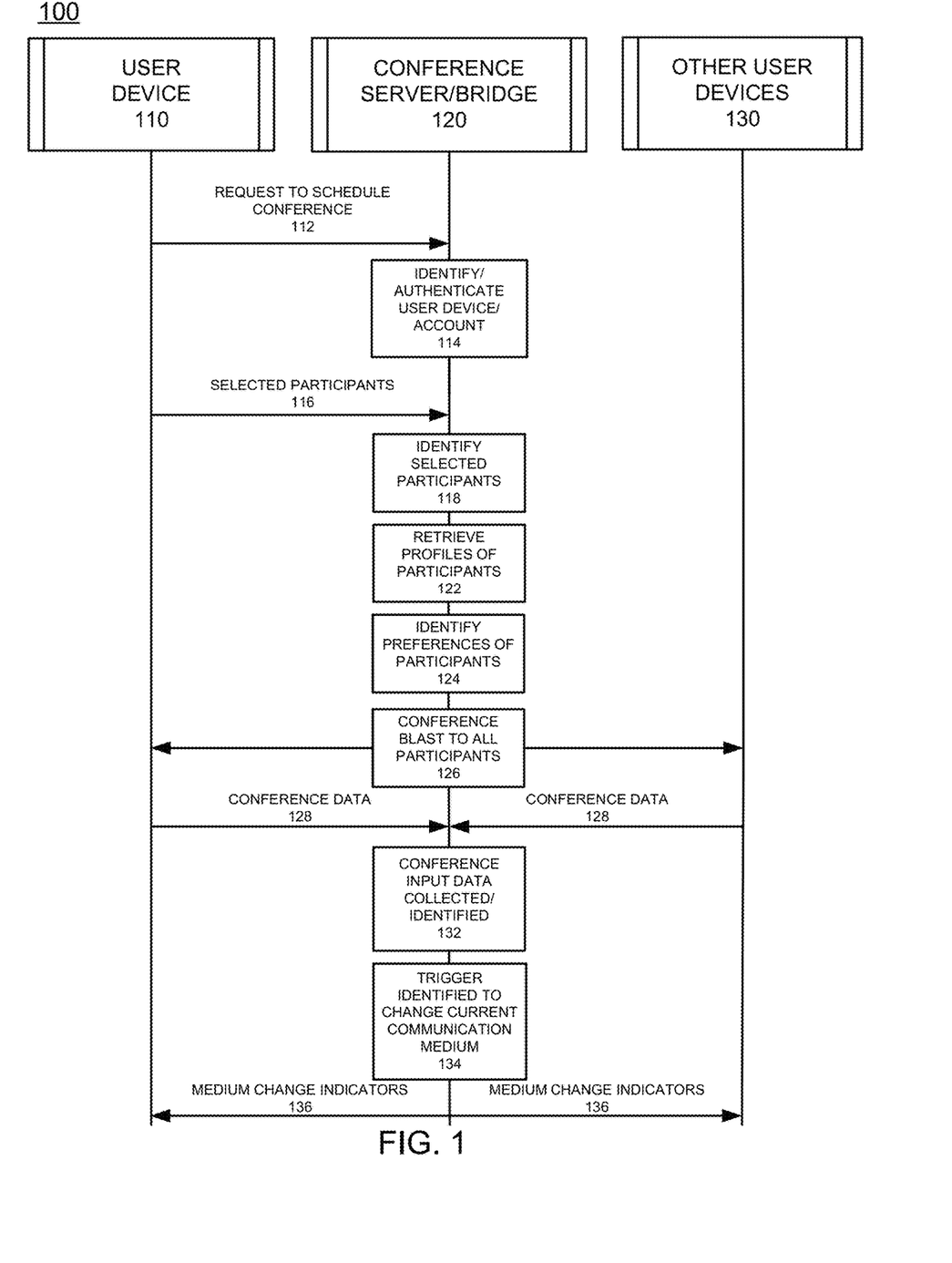
FIG. 1 illustrates an example system signaling communication example of establishing and maintaining a conference call according to example embodiments.

FIG. 1 illustrates an example system signaling communication example of establishing a conference with various participants according to example embodiments. In this example 100, the user device 110 is communicating with a conference application or via a conference telephone number to setup a conference with a conference server/bridge 120. The user device 110 is scheduling 112 in advance to setup the conference at an appointed time of a meeting. In operation, the user device 110 may submit a request 112 and the conference server 120 may identify a user account 114 and authenticate the user device 114. The selected participants 116 may be identified 118 from the user device request and their respective histories, profiles and/or preferences may be retrieved 122 to determine their preferences 124 for the active conference. Once all participants and their corresponding preferences are known, a conference blast 126 may be performed to notify, connect, message and/or call any of the scheduled participants 130.

The mediums used to conduct the conference may include calls, application interfaces, web interfaces, SMS chat sessions, message application sessions, e-mail based communication, etc. The received data 128 may be compiled as conference input data 132 and may include recorded voice, audio, video, uploaded documents, etc. The data may be stored in a conference summary and referenced to perform medium change triggers. For example, when a document is uploaded during a conference, those users participating on SMS messaging may be notified of the document via a SMS message the indicates a document has been uploaded/shared. The trigger may initiated an e-mail being sent to the user profile with a link to the document, the conference application being initiated to share an interface that includes the document, or other trigger action 134 that may or may not open a new medium, cancel the present medium and/or pause the present medium used by any one or more of the participant devices. The changes may be made based on medium change indicators 136, which are sent various participant devices.

According to example embodiments, the application may permit users of group communication to switch communication channels. In one example, the application may be a mobile phone based application that permits users to pick members belonging to the application and send a conference 'blast' outbound notification that initiates a conference to multiple users and via multiple channels.

In operation, the user may access the conference application via their computing device, select individual participants to attend that are members and/or established contacts via the application and have authorized. Then, by tapping a group and/or individual contacts, and initiating a command, an outbound session will be initiated to connect to that group and begin a voice, SMS, and/or chat session conference depending on the option selected.

In another example, a transition of a conference from one "channel" to another may be performed. If the conference was started in a chat/instant messenger application, a user can transition the entire conference to voice and/or video by simply selecting an option. All modes of conference operation, including voice, video, SMS, chat, etc., can be switched to or from dynamically and on the fly. Other switching operations may include a desire to view an attachment/document/file, to be seen, to be hear, etc. Another key feature, is a multi-mode conference. Users of the service can select available options for their account. For example, if a user is available for chat and voice or only voice or only SMS etc., then those options can be identified as the only potential options or a combination of all such options.

In a multi-mode conference scenario with various users utilizing various different types of communication mediums, the users of the application can select to utilize multi-mode conferencing. In operation, a user can be on a voice conference and switch to chat, video, or SMS communication. The application may then translate the other conference participants input using voice to text translation and corresponding messages so the user can receive and also translate that user's chat data to voice so the others on the conference can hear that person speak. Other translation and tagging operations may include voice, video, documents, presentation files, images, user device screen sharing, etc.

In one example, there may be three participants in an ongoing conference. One user may be operating a mobile phone and may be conferencing via a chat application, such as GOOGLE HANGOUTS, one may be operating a laptop computer and using a web interface and computer microphone to participate in the conference, and another user may be transmitting messages and receiving conference data via a SMS communication session on their smartphone device. The SMS session user is not sharing voice data, just text data and maybe one or more multimedia files including but not limited to compressed videos, images and/or audio. The spoken audio from the laptop user may be continuously translated into text via a voice to text translator and forwarded to the SMS session user and the chat session user. Also, the words and text submitted by the SMS and chat users may be translated to a computerized voice data that is then audibly played on the laptop user's device.

Figure 2:
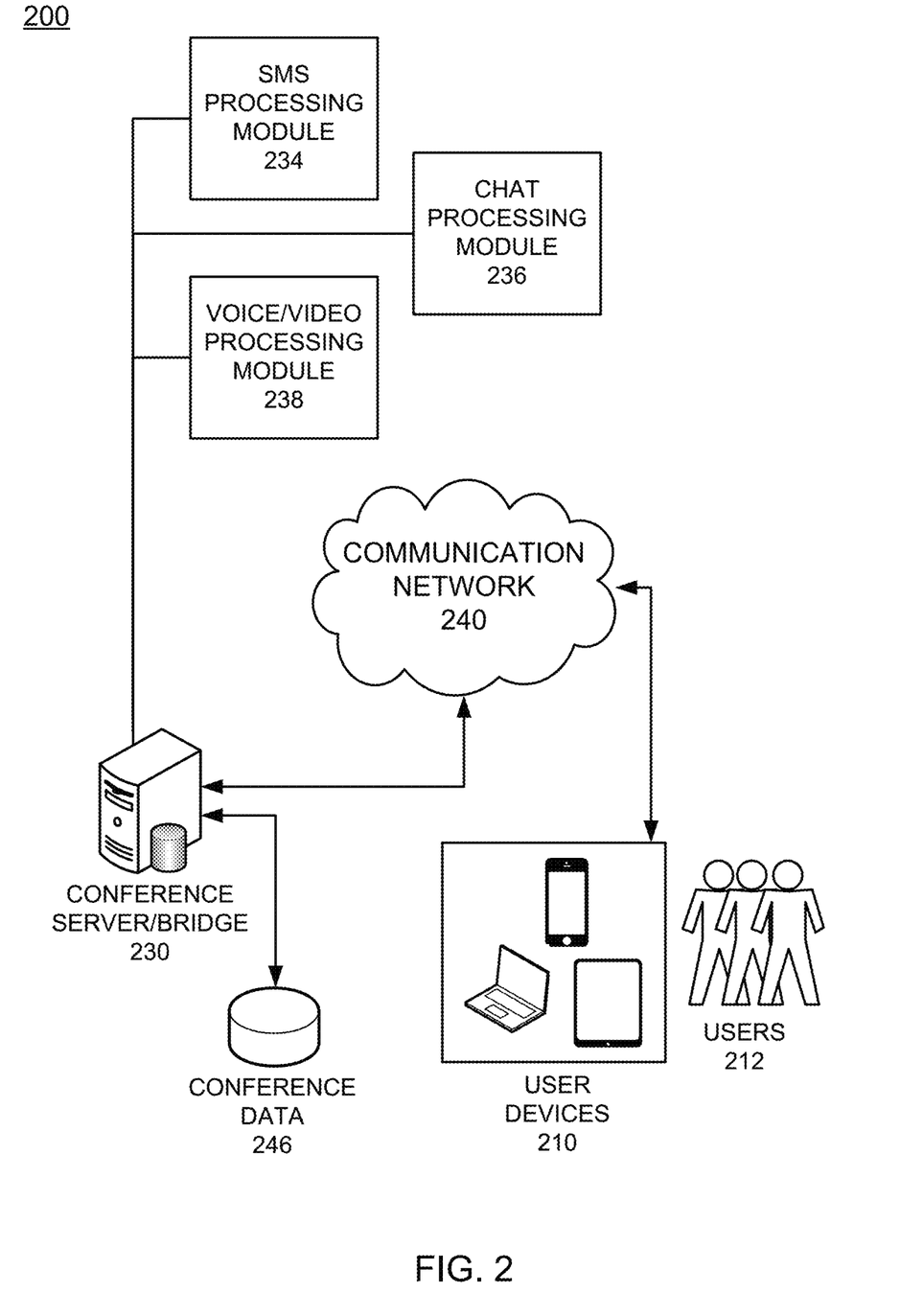
FIG. 2 illustrates an example network configuration according to example embodiments.

FIG. 2 illustrates an example network configuration according to example embodiments. Referring to FIG. 2, the communication network 200 may include user devices 210, users 212, a conference call server/bridge 230, which references conference data, which includes customer account data, preferences, history data, conference recordings and other conference data 246. In operation, the various users/participants of the conference 212 may use any one or more of their conference devices 210 to access the conference via the Internet or other communication network system 240, such as cellular, mobile data, etc. The conference server 230 has processing modules 234-238 to process content and messages from one or more SMS data, chat data, voice, video, documents, multimedia, etc.

One example of performing multi-channel conference bridging may include an active chat session that is moved to a different conference medium. Comments, images, or other content may be ported to the new medium once the changeover is completed. For example, text messages may be sent back and forth between two phone call participants via their smartphone devices. The users may be texting back and forth and they realize that text messaging is either not fast enough or is not providing the human expression that voice would provide in this example. One or more of the users may initiate a decision to upgrade the communication to an active conference. The message may be sent along with an active call from the sender to the receiver device, which initiates a call dial to the receiver along with the last message.

In another example, when moving from one text information medium to another (e.g., instant messaging (IM) or chat sessions of proprietary applications, such as GOOGLE and FACEBOOK to an SMS session), then the last message or a predefined number of messages from each user would be populated in the new medium to maintain continuity from session to session. When inviting new members, the initiator of the conference could select additional contacts to add to the new session and the change to the conference may be determined by the participants. The users may realize that they need to switch mediums, select an option on their application and click/tap/press an option to activate the switchover to the new medium. For example 'user2' may be using text messages and may send a message, such as "we need to restart a server", the conference is switched to another chat medium, and the new messaging session that all participating users may observe on their devices will say "we need to restart a server" when the users first join this new medium.

In another example, the text messaging mediums should interact well, IM to SMS and SMS interacting would be conducted via a combiner/share function that can move text between the different mediums. For voice to chat, or chat to voice, a voice to text service or text to voice service would make the translation.

Figure 3:
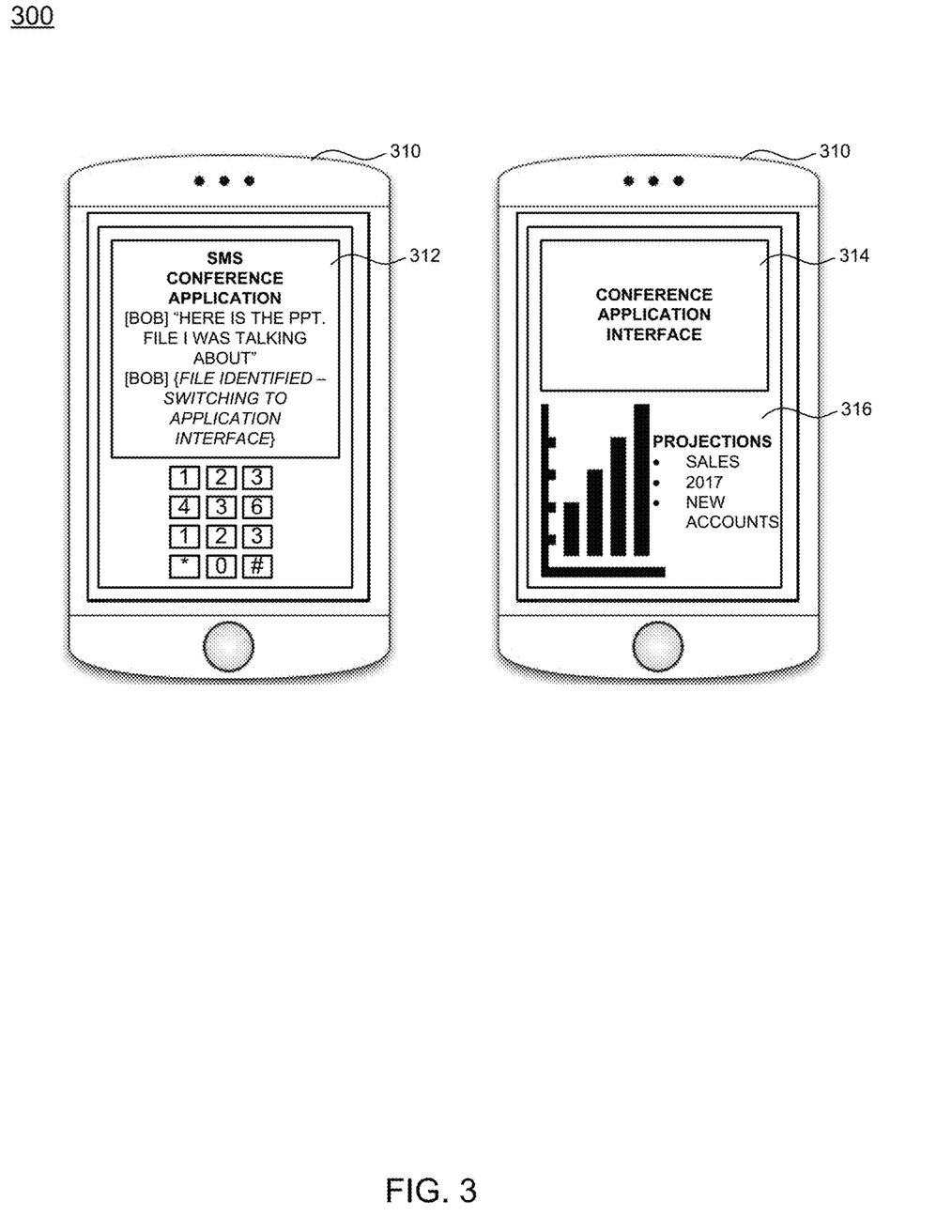
FIG. 3 illustrates a graphical user interface of a user device receiving active conference communications via a conferencing platform and changing communication mediums according to example embodiments.

FIG. 3 illustrates a graphical user interface of a user device receiving conference data via a messaging platform and switching to conference application interface according to example embodiments. In this example, the illustration 300 includes a graphical user interface for the user's device 310 with a first scenario having conference data appear as SMS data 312. The user preferences may include automated switching from an SMS interface to a conference application interface or web interface and/or a call processing platform in the event of a trigger event. For example, in this scenario, the user interface is managing the conference via a SMS data message platform. When the speaker 'BOB' then attaches a file for presentation purposes during the conference, the application may automatically open and incorporate the file data. The user preferences may be to launch the application 314 to import the file data (i.e., projections 316) when the file is uploaded and accessed by the speaker during the conference.

The conferencing configuration could have a unique number associated with every meeting. The user could utilize this meeting number instead of having to enter a date and time. The conferencing system maintains a list of invited attendees as well as which attendees have registered to be called via a callback. People can register for a meeting once the leader (or designee of the leader) has scheduled the meeting.

Figure 4A:
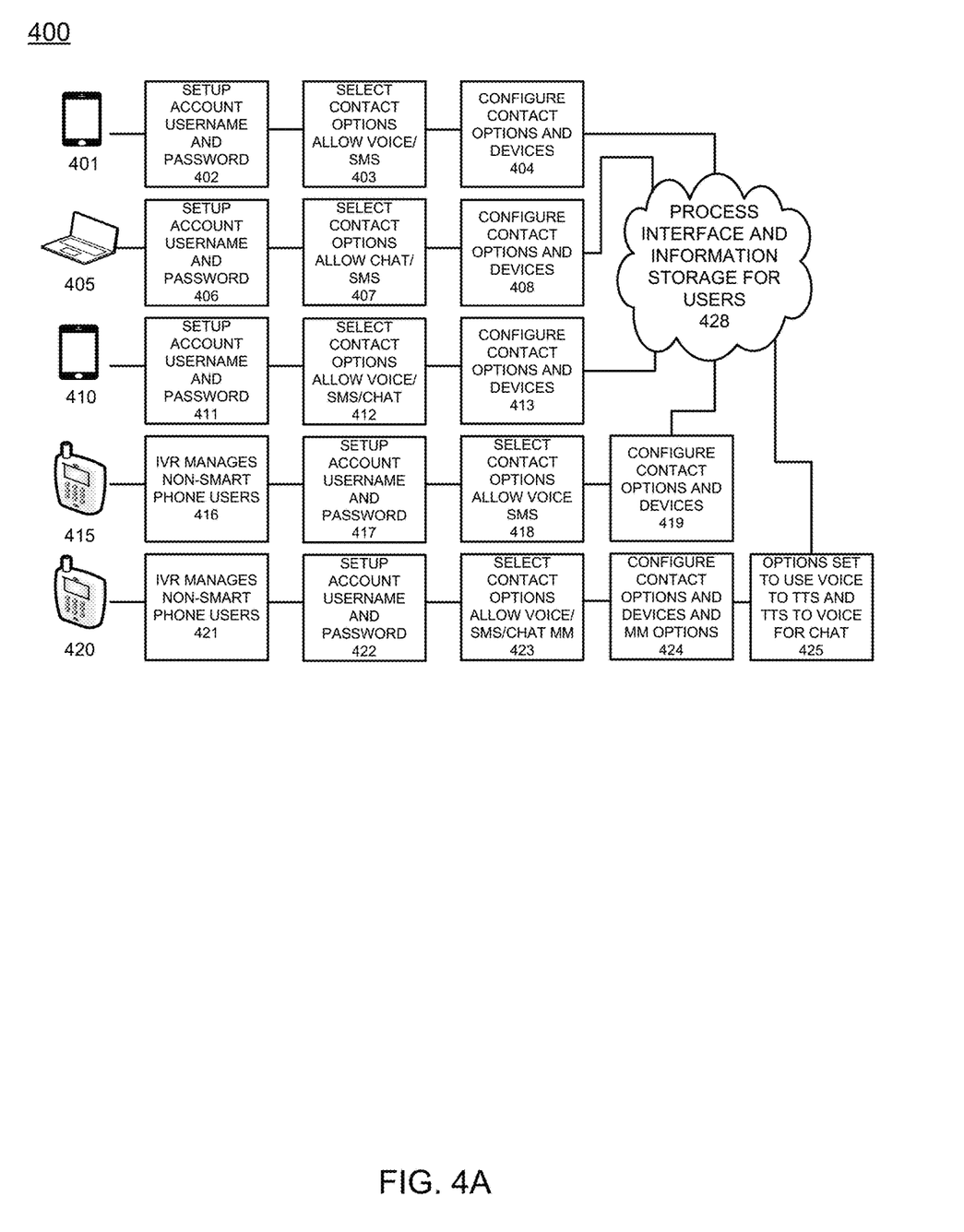
FIG. 4A illustrates an example conference communication setup configuration according to example embodiments.

FIG. 4A illustrates an example conference communication setup configuration according to example embodiments. Referring to FIG. 4A, the system 400 includes various devices registering to participate in subsequent conferences. The devices may include any device with a computing platform, such as a memory and a processor, however, in this example, the devices include a non-smart phone 415/420, a laptop 405, and a smartphone 401/405. Each of the devices 401/405/410 setup their username and password 402/406/411/417/422. The non-smart phones are managed via a IVR service 416/421. Next, the devices may enable their options for contact (operations 403, 407, 412, 418 and 423), which may include voice, SMS, chat and multi-modal (MM) modes of operation. The contact options may be set 404/408/413/419/424, in one case, this includes MM options. The options 425 for MM may be set to text to speech for chat sessions integrated with speech. Each of the example devices 401-420 may correspond to users 1-5. The cloud network 428 may represent a set of computing devices (servers) which receive, process, update profiles and engage users in a conference bridge.

Figure 4B:
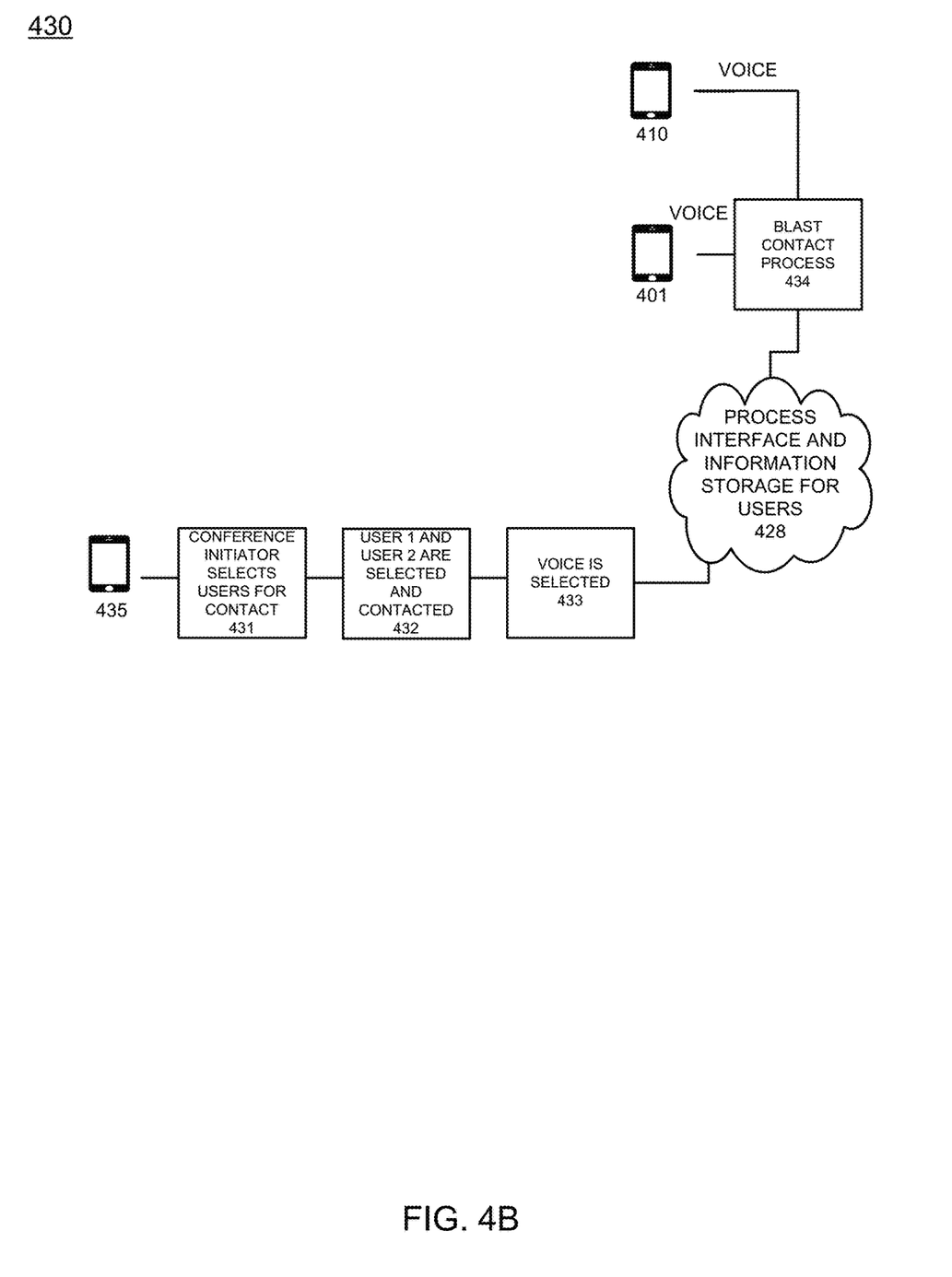
FIG. 4B illustrates an example conference configuration for using voice as a communication medium according to example embodiments.

FIG. 4B illustrates an example conference configuration for using voice as a communication medium according to example embodiments. Referring to FIG. 4B, the configuration 430 may include an initiator device 435 initiating a conference by selecting users for contact purposes during the conference 431. In this example of a conference setup, the conference initiator 435 may select users 431 to participate in the conference, the user profiles are identified and selected for communication and are then contacted 432 via a first communication medium, which in this case is voice 433. The computing network may process the interface and information storage for the users 428. The blast contact process 434 may be operating on the interface cloud 428 and may setup a communication with the invitees, in this example, smartphone devices of users #1 and #3—401 and 410. The communication is setup as voice in the initial configuration.

Figure 4C:
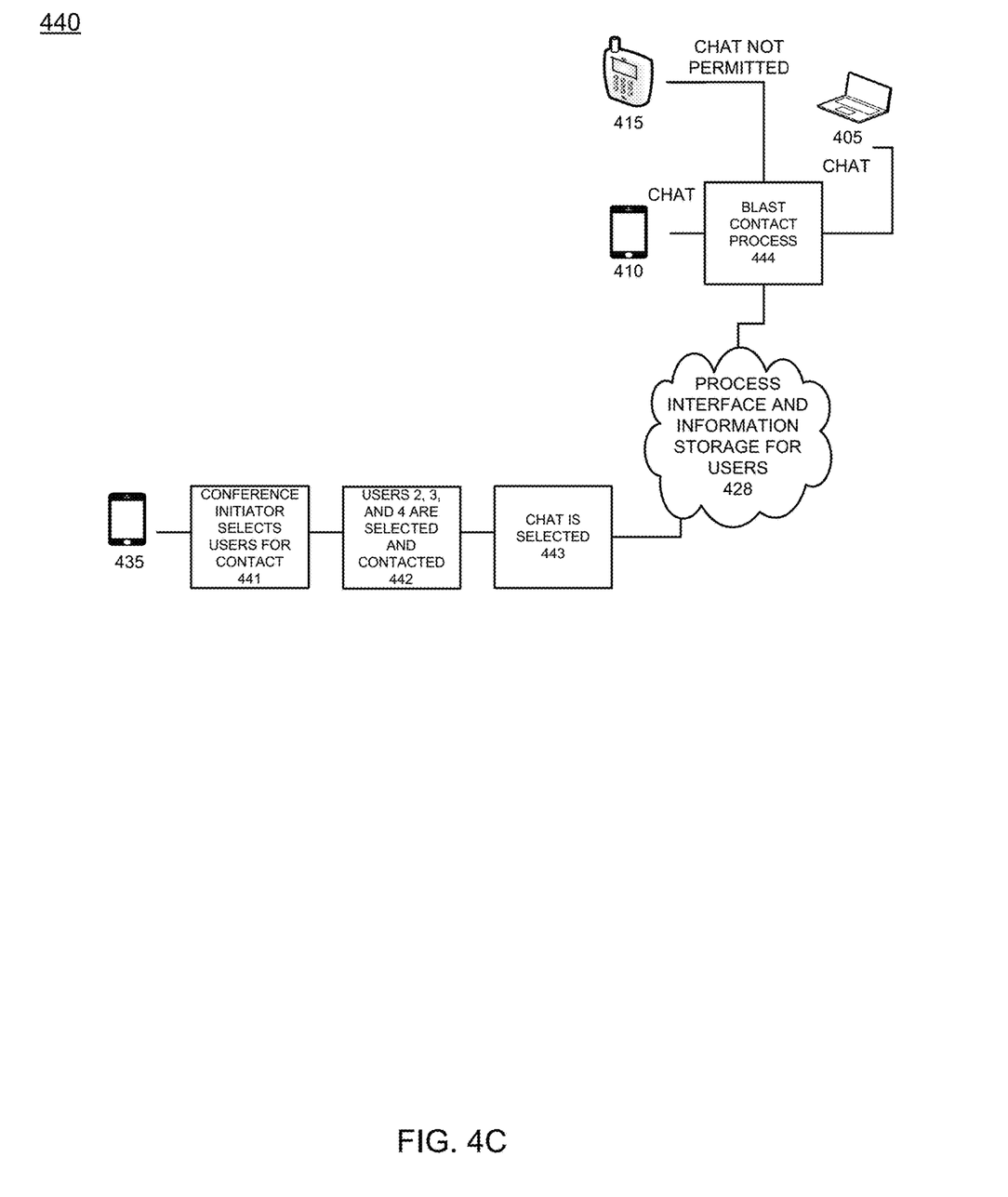
FIG. 4C illustrates an example conference configuration for using chat as a communication medium where one participant has not enabled chat according to example embodiments.
Figure 4D:
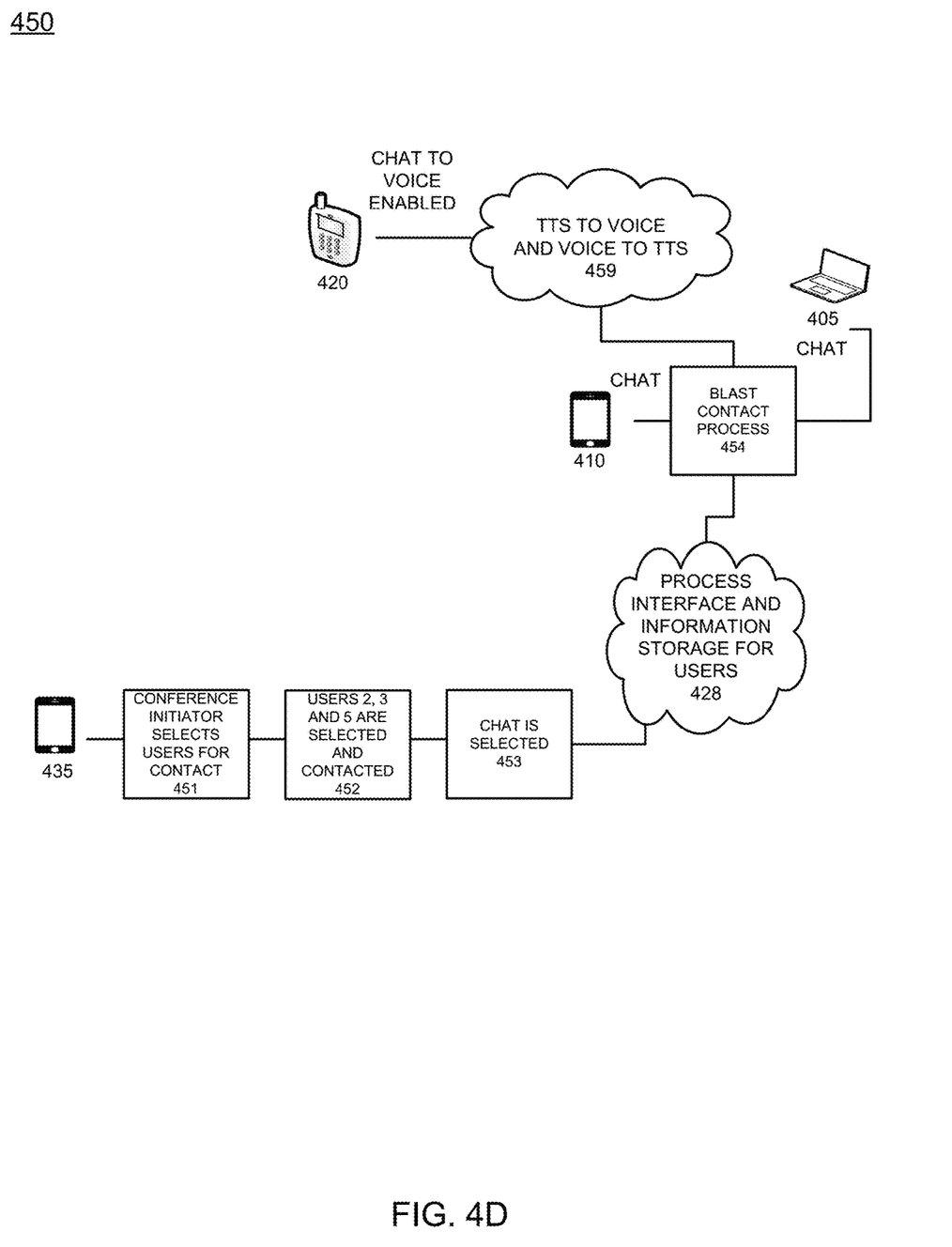
FIG. 4D illustrates an example conference configuration for using voice as a communication medium where all participants have enabled chat according to example embodiments.

FIG. 4C illustrates an example conference configuration for using chat as a communication medium where one participant has not enabled chat according to example embodiments. Referring to FIG. 4D, in this example 440, the conference initiator selects users 2, 3 and 4 in operation 442. Also, chat is the selection made as the initial type of communication medium 443. The blast process 444 may then send initial chat messages to the invitees, however, in this example, the only entities which can communicate are 405 and 410, as 415 did not designate chat as a contact option (see 418 of FIG. 4A).

FIG. 4D illustrates an example conference configuration for using voice as a communication medium where all participants have enabled chat according to example embodiments. Referring to FIG. 4D, the example 450 includes the initiator 435 selecting users for the conference 451, such as users 2, 3 and 5 452, and chat being selected 453. The process interface 428 instructs the blast process 454 to communicate with the users 2 and 3 and to permit the user 5 to talk via voice via a chat to voice configuration supported by a TTS to voice engine 459. This option was set 425 (see FIG. 4A) and was invoked to permit a non-smart phone 420 to communicate in an otherwise all chat session by sending and receiving voice communications, which are managed by the network configuration 459. The translation efforts permit the non-smart device to participate in a conference.

Figure 4E:
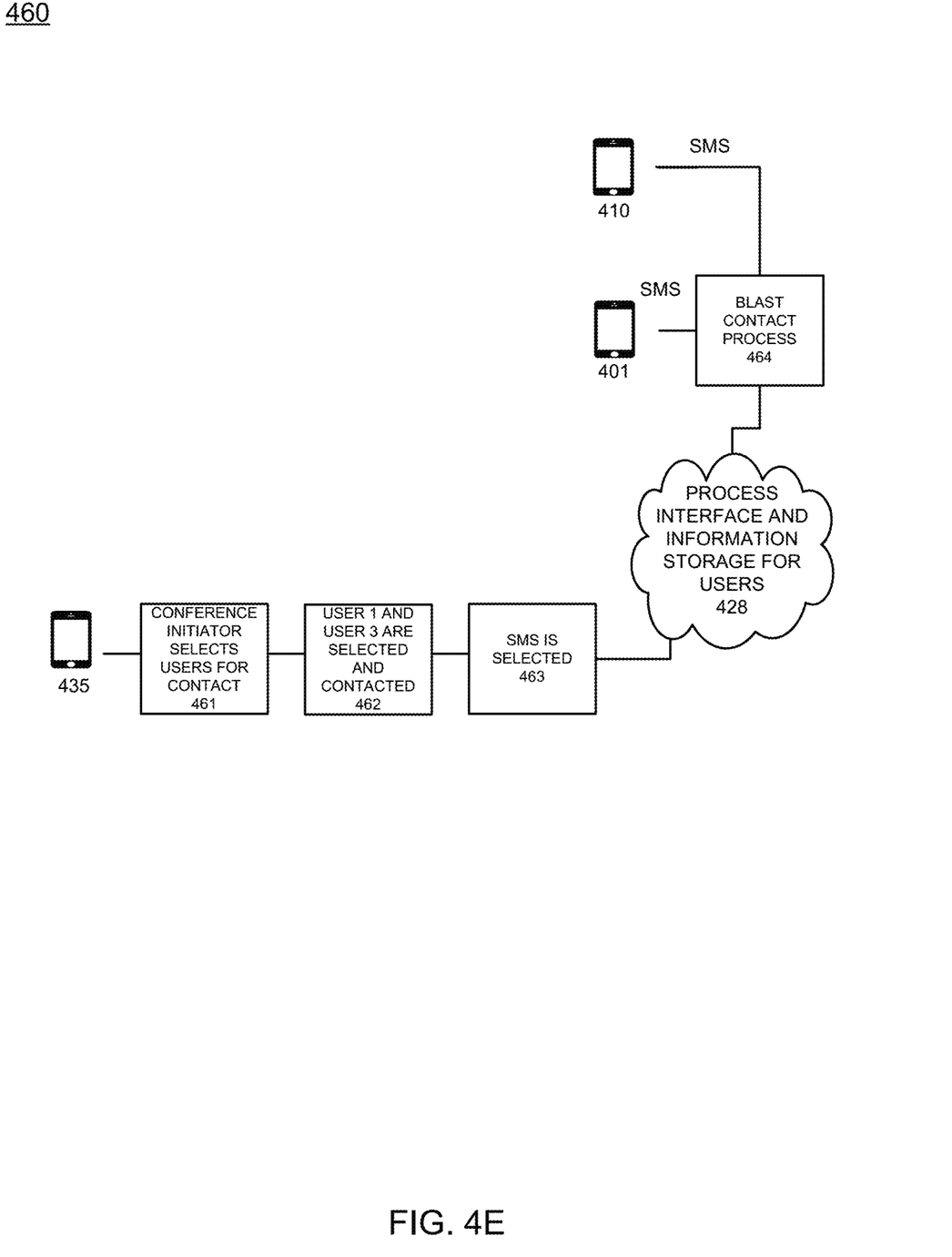
FIG. 4E illustrates an example conference configuration for using SMS as a communication medium according to example embodiments.

FIG. 4E illustrates an example conference configuration for using SMS as a communication medium according to example embodiments. Referring to FIG. 4E, the configuration 460 provides the initiator setting up the conference 461 with users 1 and 2 being contacted 462 and SMS being selected 463 as the initial medium selection. The process 464 then communicates to the users 1 and 3 (401 and 410) via SMS communications on the initial communication medium.

Figure 4F:
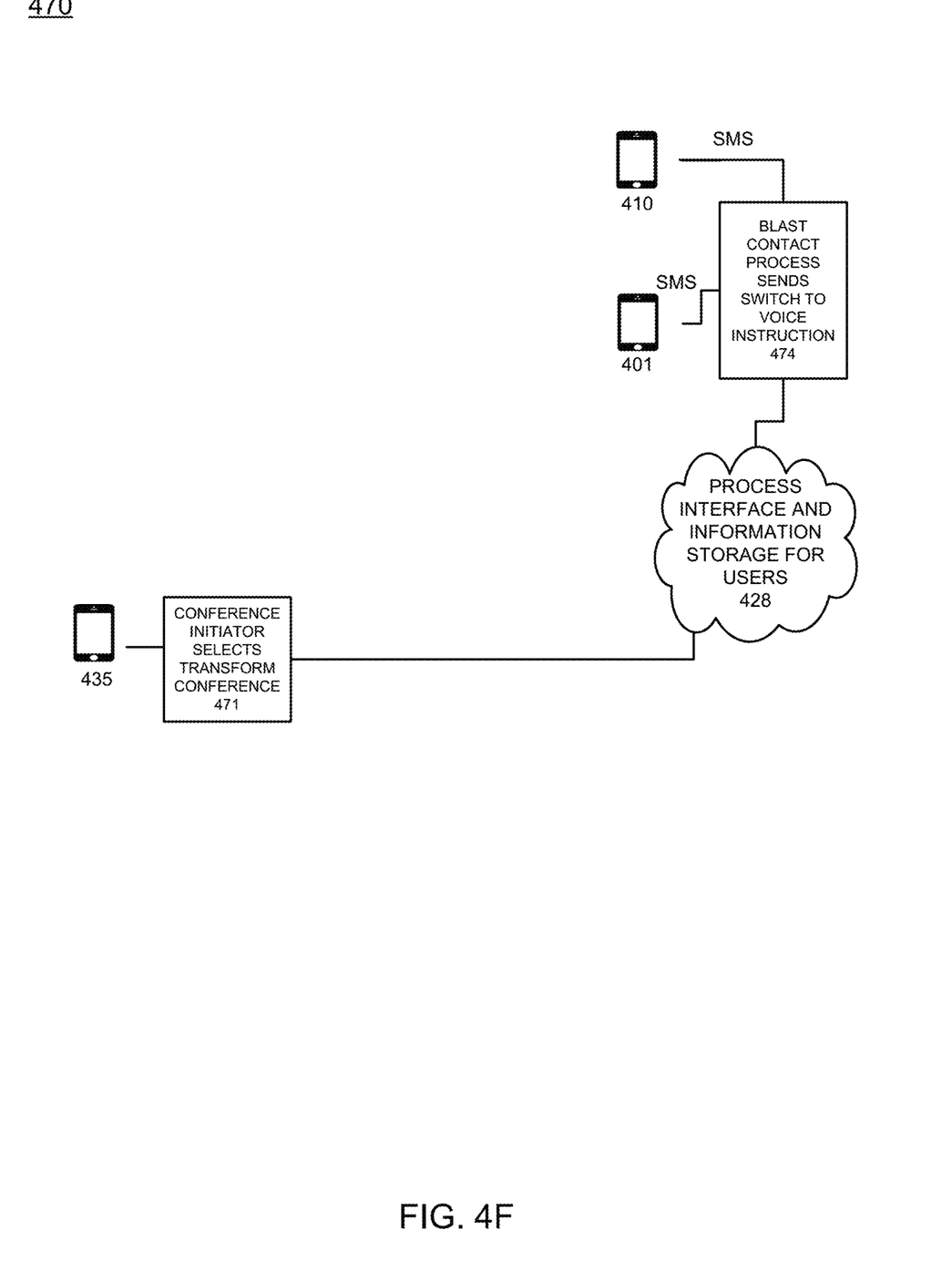
FIG. 4F illustrates an example conference configuration for transforming a SMS session to voice as a communication medium according to example embodiments.

FIG. 4F illustrates an example conference configuration for transforming a SMS session to voice as a communication medium according to example embodiments. Referring to FIG. 4F, the configuration 470 provides the conference initiator selecting a transform conference option 471, and the blast process 474 will send out a switch to voice instruction or switch communication medium to a new communication medium.

Figure 4G:
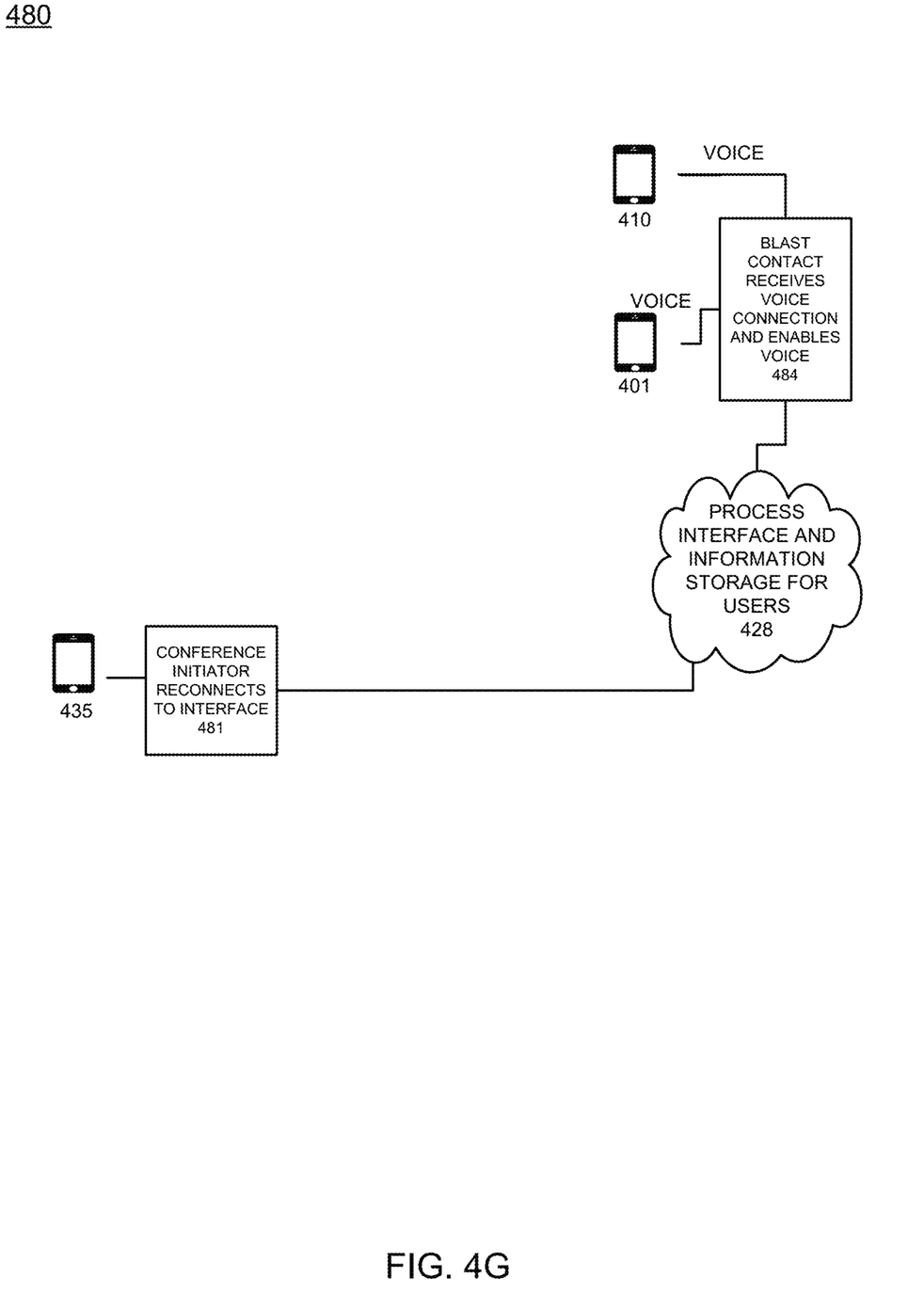
FIG. 4G illustrates an example conference configuration for using voice as a communication medium after a transfer instruction according to example embodiments.

FIG. 4G illustrates an example conference configuration for using voice as a communication medium after a transfer instruction according to example embodiments. Referring to FIG. 4G, continuing with the same example of FIG. 4F, the configuration 480 provides the conference initiator reconnecting to the interface 481 and the blast process receives the voice connection and enables voice 484 to the participants.

Figure 5:
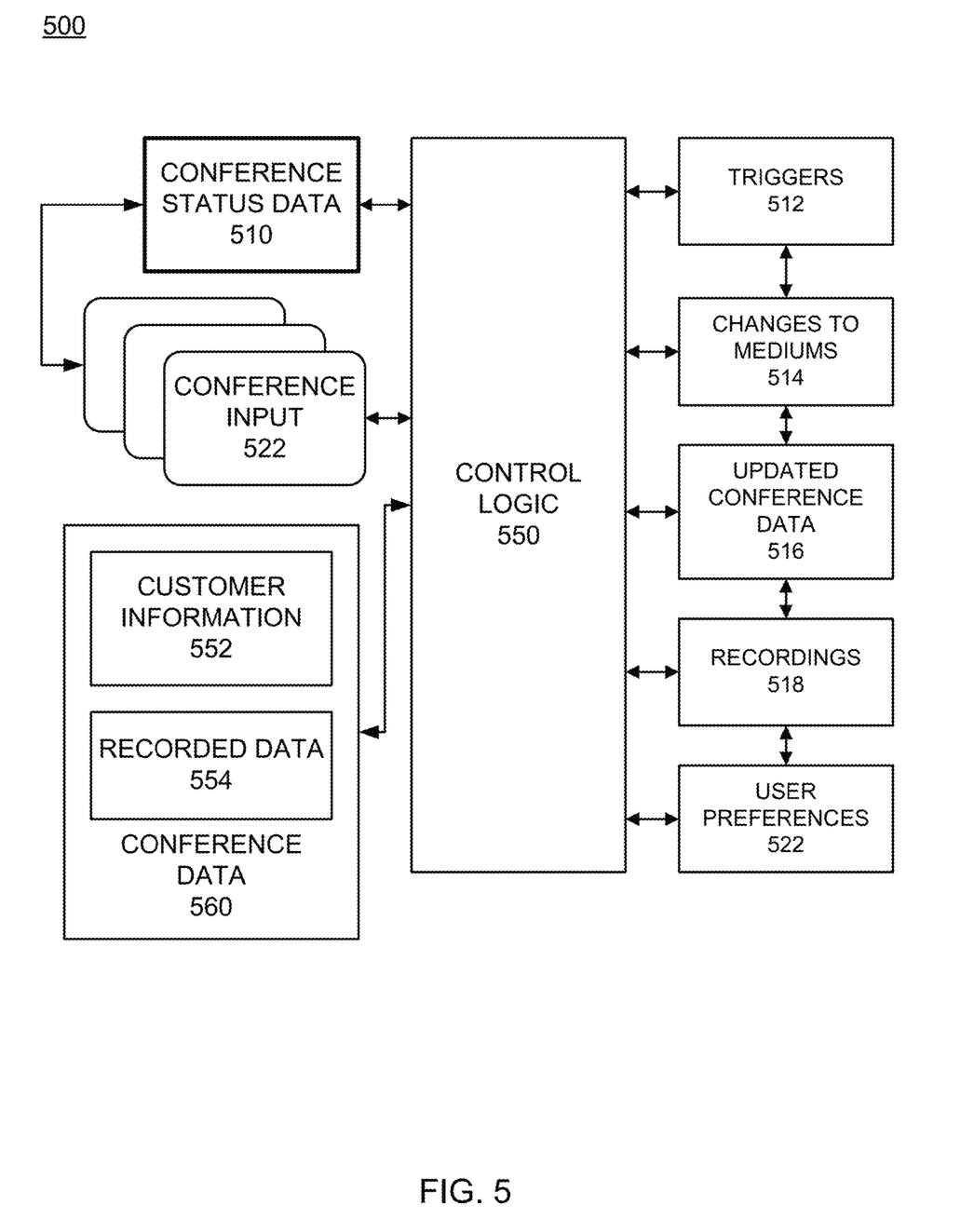
FIG. 5 illustrates a logic diagram for processing conference communications for a conference call according to example embodiments of the present application.

FIG. 5 illustrates a logic diagram 500 for processing SMS communications for a conference call according to example embodiments of the present application. Referring to FIG. 5, the logic may include a processor or controller 550 which receives a set of input, such as conference input 522, including, but not limited to SMS messages, e-mails, chat content, conference voice/video, documents, etc. The conference data 522 pools all inputted data from any of the members and may cause the conference status 510 to change from one first platform to another depending on the trigger event. For example, the addition of presentation file may cause a trigger that enables the logic to launch a modified interface to any one or more of the participants based on their preferences. The output of the logic module 550 may be a trigger 512, changes to the mediums of the user devices 514, updated conference data 516 that is recorded during the conference, recordings of audio or text, and user preferences which may be updated at any time. The conference data 540 may be stored in a data repository on the cloud or server. The customer information 552 may be separate from the actual conference recordings 554 of the conference data 560.

One example method may include receiving a conference initiation notification from one of a plurality of conference participant devices at a conference server, identifying a plurality of different communication mediums corresponding to the plurality of conference participant devices, including mediums which are available and/or which are accepted by the participant devices. The method may also include selecting an initial communication medium to establish a conference with the plurality of conference participant devices, and transmitting a conference contact message to the plurality of conference participant devices to initiate a conference.

The method may also include determining a trigger event during the conference, and transmitting a change of medium command to one or more of the plurality of conference participant devices. The trigger event includes identification that one or more of the plurality of conference participant devices is incompatible with the initial communication medium. The plurality of different communication mediums include at least two of a short message service (SMS) medium, a chat application medium, a phone call, and a web-enabled application interface medium. The plurality of different communication mediums are identified from pre-stored contact options stored in user profiles associated with the conference participant devices. The conference initiation notification is received from a designated conference initiator device among the plurality of conference participant devices. The method may also include selecting a portion of communication data exchanged during the conference on the initial communication medium, and copying the portion of the communication data exchanged into a new communication medium assigned to the conference.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
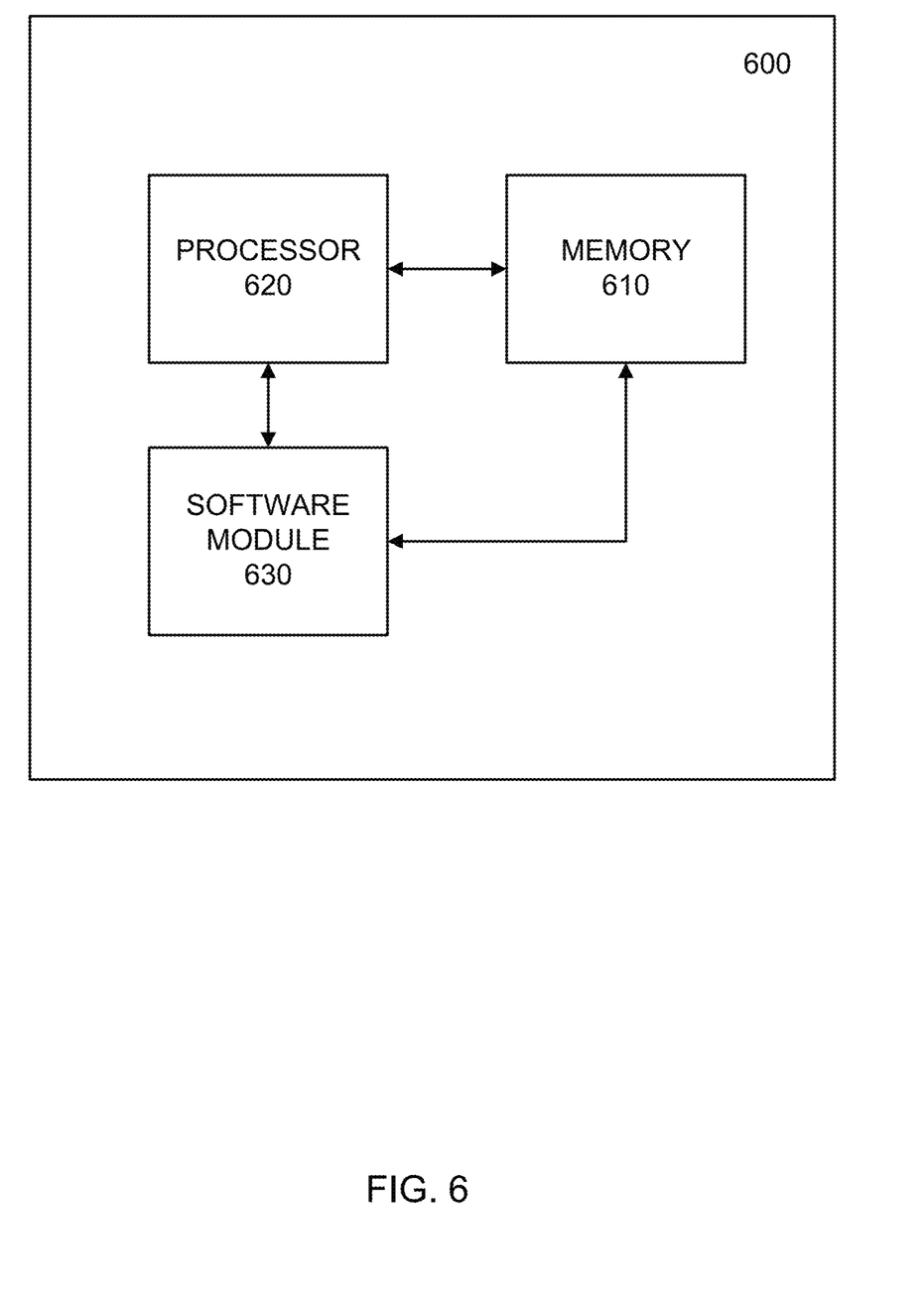
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving a conference initiation notification from one of a plurality of conference participant devices at a conference server;
   identifying a plurality of different communication mediums corresponding to the plurality of conference participant devices;
   selecting an initial communication medium to establish a conference with the plurality of conference participant devices;
   transmitting a conference contact message to the plurality of conference participant devices to initiate a conference on the initial communication medium;
   receiving, during the conference on the initial communication medium, a request from one of the plurality of conference participant devices to switch from the initial communication medium to another communication medium;
   switching the one of the plurality of conference participant devices to the another communication medium;
   automatically translating a communication, in the another communication medium, from the one of the plurality of conference participant devices to the initial communication medium for receipt by another device of the plurality of conference participant devices; and
   automatically translating a communication, in the initial medium, from another device of the plurality of conference participant devices to the initial communication medium for receipt by the one of the plurality of conference participant devices.

2. The method of claim 1, further comprising:
   identifying a trigger event during the conference; and
   transmitting a change of medium command to one or more of the plurality of conference participant devices.

3. The method of claim 2, wherein the identifying a trigger event comprises:
   identifying that one or more of the plurality of conference participant devices is incompatible with the initial communication medium.

4. The method of claim 1, wherein the plurality of different communication mediums comprise at least two of: a short message service (SMS) medium, a chat application medium, a phone call, and a web-enabled application interface medium.

5. The method of claim 1, wherein the plurality of different communication mediums are identified from pre-stored contact options stored in user profiles associated with the conference participant devices.

6. The method of claim 1, wherein the conference initiation notification is received from a designated conference initiator device among the plurality of conference participant devices.

7. The method of claim 1, further comprising:
selecting a portion of communication data exchanged during the conference on the initial communication medium; and
copying the portion of the communication data exchanged into a new communication medium assigned to the conference.

8. An apparatus, comprising:
a receiver configured to:
receive a conference initiation notification from one of a plurality of conference participant devices at a conference server;
a processor configured to:
identify a plurality of different communication mediums corresponding to the plurality of conference participant devices;
select an initial communication medium to establish a conference with the plurality of conference participant devices; and
a transmitter configured to:
transmit a conference contact message to the plurality of conference participant devices to initiate a conference on the initial communication medium,
wherein the receiver is further configured to:
receive, during the conference on the initial communication medium, a request from one of the plurality of conference participant devices to switch from the initial communication medium to another communication medium, and
wherein the processor is further configured to:
switch the one of the plurality of conference participant devices to the another communication medium,
automatically translate a communication, in the another communication medium, from the one of the plurality of conference participant devices to the initial communication medium for receipt by another device of the plurality of conference participant devices; and
automatically translate a communication, in the initial medium, from another device of the plurality of conference participant devices to the initial communication medium for receipt by the one of the plurality of conference participant devices.

9. The apparatus of claim 8, wherein the processor is further configured to:
identify a trigger event during the conference, and
the transmitter is further configured to:
transmit a change of medium command to one or more of the plurality of conference participant devices.

10. The apparatus of claim 9, wherein the trigger event comprises:
an identification that one or more of the plurality of conference participant devices is incompatible with the initial communication medium.

11. The apparatus of claim 8, wherein the plurality of different communication mediums comprise at least two of:
a short message service (SMS) medium, a chat application medium, a phone call, and a web-enabled application interface medium.

12. The apparatus of claim 8, wherein the plurality of different communication mediums are identified from pre-stored contact options stored in user profiles associated with the conference participant devices.

13. The apparatus of claim 8, wherein the conference initiation notification is received from a designated conference initiator device among the plurality of conference participant devices.

14. The apparatus of claim 8, wherein the processor is further configured to:
select a portion of communication data exchanged during the conference on the initial communication medium, and
copy the portion of the communication data exchanged into a new communication medium assigned to the conference.

15. A non-transitory computer readable storage medium configured to store one or more instructions that when executed by a processor causes a processor to perform:
receiving a conference initiation notification from one of a plurality of conference participant devices at a conference server;
identifying a plurality of different communication mediums corresponding to the plurality of conference participant devices;
selecting an initial communication medium to establish a conference with the plurality of conference participant devices;
transmitting a conference contact message to the plurality of conference participant devices to initiate a conference on the initial communication medium;
receiving, during the conference on the initial communication medium, a request from one of the plurality of conference participant devices to switch from the initial communication medium to another communication medium;
switching the one of the plurality of conference participant devices to the another communication medium;
automatically translating a communication, in the another communication medium, from the one of the plurality of conference participant devices to the initial communication medium for receipt by another device of the plurality of conference participant devices; and
automatically translating a communication, in the initial medium, from another device of the plurality of conference participant devices to the initial communication medium for receipt by the one of the plurality of conference participant devices.

16. The non-transitory computer readable storage medium of claim 15, wherein the one or more instructions are further to cause the processor to perform:
identifying a trigger event during the conference; and
transmitting a change of medium command to one or more of the plurality of conference participant devices.

17. The non-transitory computer readable storage medium of claim 16, wherein the trigger event comprises:
identifying that one or more of the plurality of conference participant devices is incompatible with the initial communication medium.

18. The non-transitory computer readable storage medium of claim 15, wherein the plurality of different communication mediums comprise at least two of:
a short message service (SMS) medium, a chat application medium, a phone call, and a web-enabled application interface medium.

19. The non-transitory computer readable storage medium of claim 15, wherein the plurality of different communication mediums are identified from pre-stored contact options stored in user profiles associated with the conference participant devices.

20. The non-transitory computer readable storage medium of claim 15, wherein the one or more instructions are further to cause the processor is to perform: selecting a portion of communication data exchanged during the conference on the initial communication medium; and placing the portion of the communication data exchanged in a new communication medium assigned to the conference.

* * * * *